March 9, 1954 L. S. HAMER 2,671,471
ANGULAR FLOW CONTROL FITTING
Filed Oct. 18, 1948 2 Sheets-Sheet 1
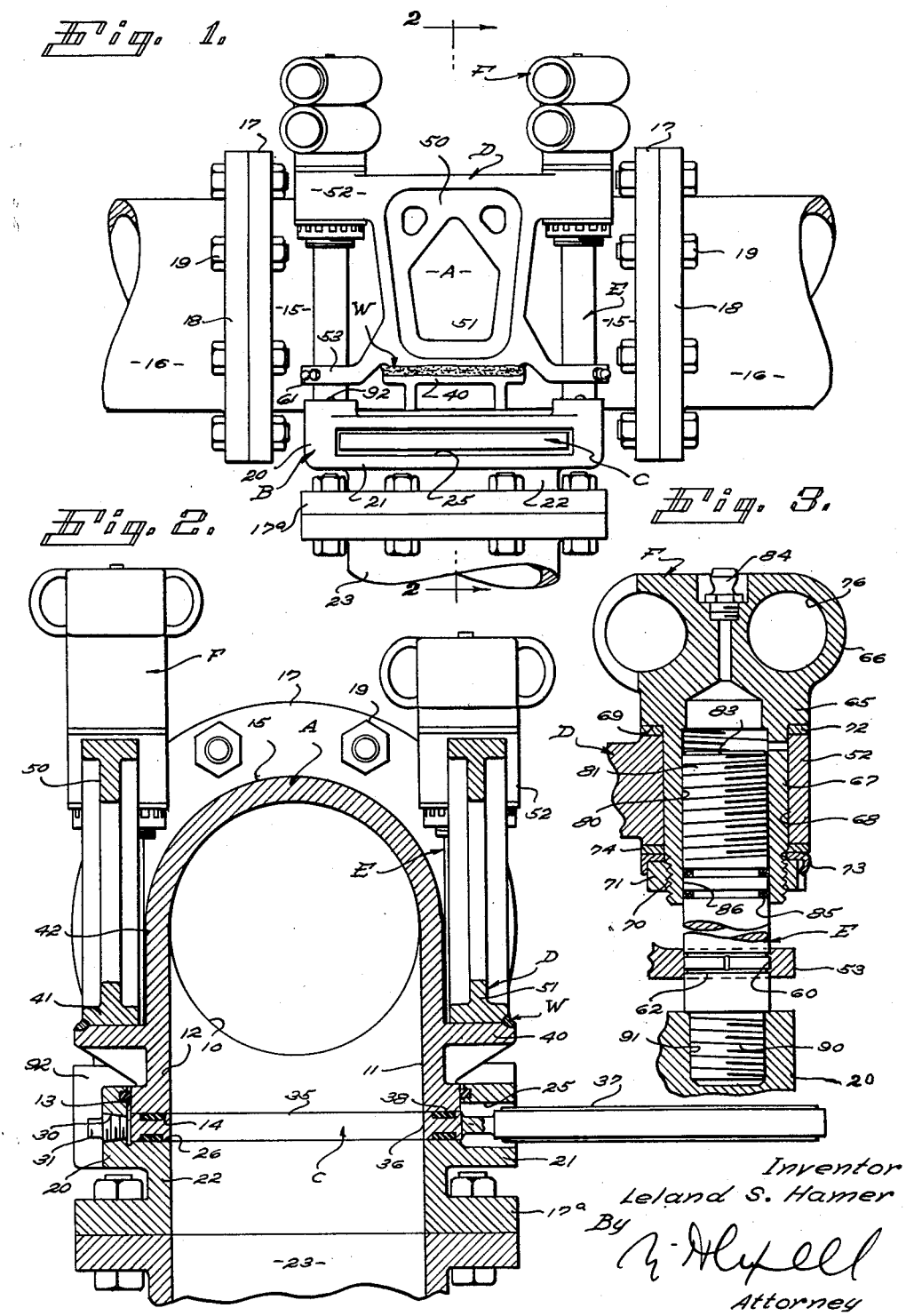
Inventor
Leland S. Hamer
By
Attorney

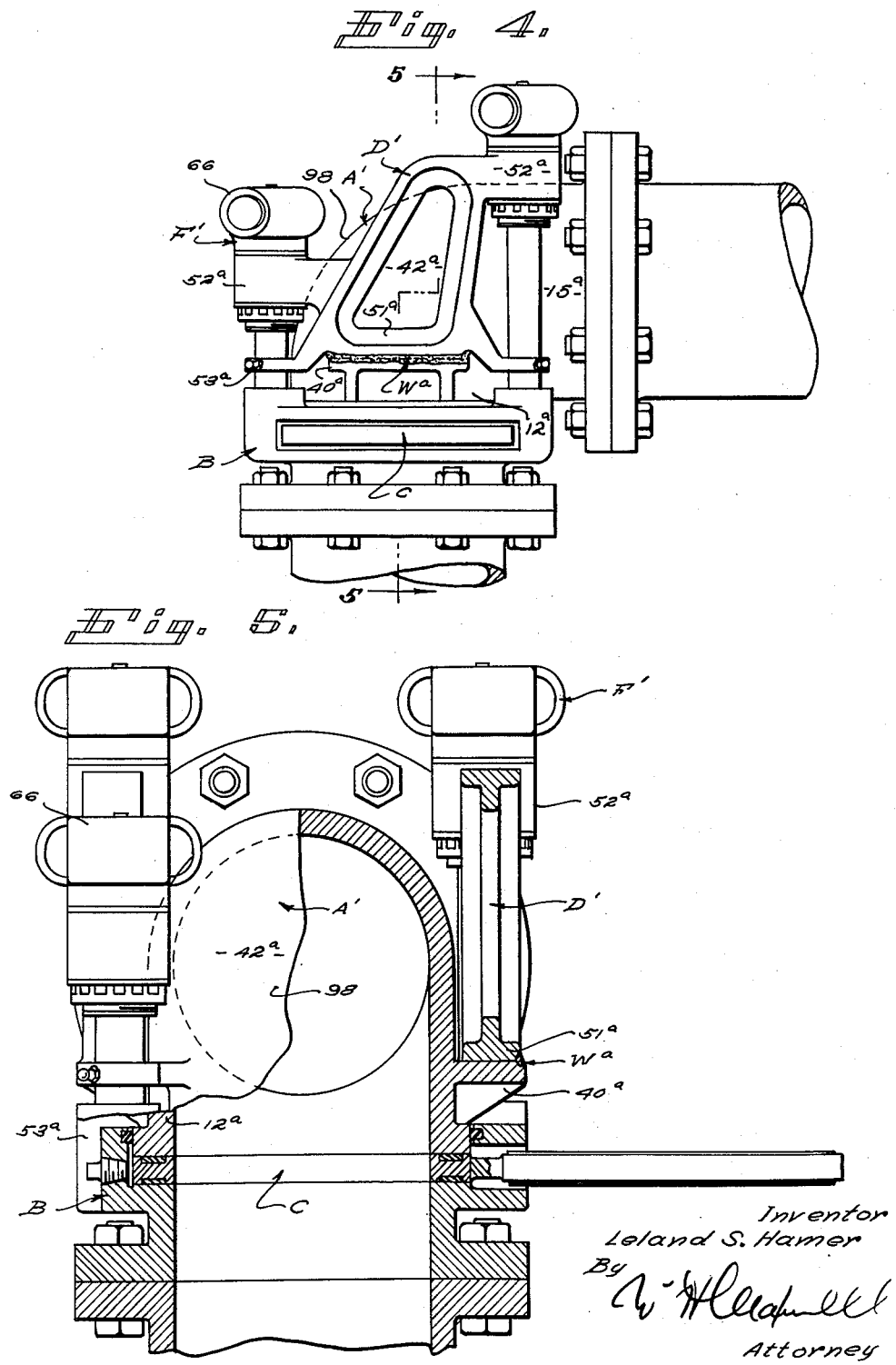

Patented Mar. 9, 1954

2,671,471

UNITED STATES PATENT OFFICE 2,671,471

ANGULAR FLOW CONTROL FITTING

Leland S. Hamer, Long Beach, Calif., assignor of one-fourth to Paul A. Dewhirst, Los Angeles, Calif.

Application October 18, 1948, Serial No. 55,133

13 Claims. (Cl. 138—94.3)

This invention has to do with an angular flow control fitting, that is, with a fitting in the nature of a line blind, it being a general object of the invention to provide a fitting applicable to a manifold, or pipe line, system in a situation where a fitting such as an L or T is ordinarily used.

Manifolds and piping systems are in use and are installed requiring occasional modification as, for instance, by the insertion or application of line blind fittings at various points. Ordinarily line blinding devices are generally inserted in a line between sections that are arranged end to end or in aligned relation.

It is a general object of this invention to provide an angular fitting including a blinding device or flow control plate which fitting is applicable to a manifold or pipe line system in the place of or in the space normally occupied by an angular fitting such as an L or a T. An important feature of the present invention is the provision of a fitting which can be installed in the manner stated without otherwise disturbing or interfering with the manifold or piping system. In manifolds or systems involving large, heavy or complicated arrangements, this feature of the invention is of major practical significance.

It is another object of this invention to provide a fitting of the general character referred to including a plurality of operators or operating members to be engaged by an operating device or tool, which members are so related as to permit of simple easy operation and with a minimum of interference between the various parts.

It is a further object of this invention to provide a fitting of the general character referred to including a simplified, improved, practical relationship of brackets on the body of the fitting supporting studs which operate the clamp section that serves to seal the blinding plate with the body.

Another object of the invention is to provide an improved construction for operating the studs embodied in the fitting, which construction includes operating members rotatably carried by the body brackets and having threaded engagement with the studs so that the studs are effectively supported or guided while the operating members are securely supported for ready operation or rotation.

The various objects and features of my invention will be fully understood from the following detailed description of typical preferred forms and applications of my invention, throughout which description reference is made to the accompanying drawings, in which:

Fig. 1 is a view of a fitting embodying the present invention applicable to parts of a manifold or pipe line where a T-fitting might be used, and showing the blinding plate in place and the general relationship of the clamp section which clamps the plate to the body, the studs that project from the clamp section and the operating means that engage the studs. Fig. 2 is an enlarged sectional view taken as indicated by line 2—2 on Fig. 1. Fig. 3 is an enlarged detailed view of a portion of the parts shown in Figs. 1 and 2, showing the detail of an operator carried by a bracket of the body and having threaded engagement with a stud projecting from the clamp section. Fig. 4 is a view similar to Fig. 1, showing a form of the invention applied to manifold or pipe parts as an L-fitting might be, and Fig. 5 is an enlarged sectional view of the structure shown in Fig. 4, being a view taken as indicated by line 5—5 on Fig. 4.

Referring first to the form of the invention illustrated in Figs. 1 to 3 of the drawings, the invention provides, generally, a plurality of principal sections, namely, a body A, a clamp B, and a plate C engageable between the clamp and the body. The structure further includes brackets D applied to the body A and preferably fixed thereon, studs E projecting from the clamp section and guided by the brackets, and operating means F carried by the brackets and engaging the studs and operable to shift the studs relative to the brackets to effect movement of the clamp relative to the body.

The body A is characterized by a flow conducting passage or opening and in the case under consideration the opening of the body has aligned end portions 10 and a laterally disposed end portion 11 in communication with the end portions 10 but extending at right angles thereto.

The end portion 12 of body A defining the lateral portion 11 of the body opening has a turned or finished exterior 13 and terminates in a flat end or clamp face 14 normal to the axis of the opening portion 11. The end portion 12 of the body A is characterized by a flow conducting passage or opening and in the case under consideration the opening of the body has aligned end portions 10 and a laterally disposed end portion 11 in communication with the end portions 10 but extending at right angles thereto. Portion 12 of body A has a turned or finished exterior 13 and terminates in a flat end 14 normal to the axis of the opening portion 11. The body portion 12 forms a support or carrier for the clamp section B of the structure, as will be hereinafter described.

The end portions 15 of the body A defining the aligned portions 10 of the body opening are provided with suitable coupling means whereby connection may be made with aligned pipe sections or elements 16, as shown in the drawings. In the particular case illustrated the coupling means are formed by flanges 17 on the ends of the body portions 15, the flanges 17 being such as to receive pipe flanges 18. The flanges 17 and 18 are shown secured by releasable fasteners 19.

From the foregoing description it will be apparent that the body A, which may, in practice, be a forging or casting, is in the nature of a T and from examination of the drawings it will be apparent that the body may be proportioned so that the space between flanges 17 correspond to that that occurs between the flanges of a standard T-fitting, whereas the shoulder or clamp face 14 of body part 12 terminates short of the normal position of the shoulder provided on the laterally projecting portion of a T-fitting The clamp section B of the structure involves, generally, an annular or sleeve-like part 20 slidably carried on the turned exterior 13 of body part 12 and a chest 21 projects from or is carried by the sleeve. A neck portion or extension 22 of the sleeve carries connecting or coupling means by which connection may be made with a laterally disposed pipe element 23. In the case illustrated the extension 22 is provided with a coupling flange 17ª similar in character to the flanges 17 above described.

The chest 21 is a laterally disposed structure on the sleeve 20 and it is formed with a passage or access opening 25 which serves to admit the plate C into position between the end 14 of body portion 12 and a shoulder 26 in the clamp section. It is to be understood that in practice the fitting may be positioned in any suitable manner or so that the chest faces or opens in any desired direction. In a case where the chest is arranged to open up it may be desirable to employ a drain opening 30 in the sleeve at the bottom of the chest or in the sleeve opposite the chest, which opening is normally closed by a plug 31.

The plate section of the structure may vary in form and construction. However, ordinarily it will be a simple line blinding plate having an end 35 with a passage or opening 36 therethrough that can be registered with the opening 11 in the body A and an end 37 which is imperforate and which when in place in the structure between the face 14 and shoulder 26 closes off the passage or opening 11. Further, it will be apparent that the ends or portions of the plate may be provided with sealing means or packing 38 which serves to prevent leakage between the engaged parts.

The general construction and arrangement of parts as provided by the present invention permits the flange 17ª being located relative to the flanges 17 in the manner that the lateral or side flange of an ordinary T-fitting is located relative to the end flanges, all with the result that the structure may be inserted in a manifold or pipe system in place of or in a situation suitable for a standard T-fitting.

The brackets D provided by the present invention are secured fixed to the body A at opposite sides thereof and in accordance with the preferred form of the invention they are formed separate from the body and are rigidly or permanently attached to the body as by welding W, or the like. In the case illustrated the body A is provided at corresponding points at opposite sides with projecting shelf-like members 40 having shoulders 41 for supporting the brackets. The shelf-like parts 40 are preferably integral projections on the exterior of the body and occur where the portion 12 of the body joints the main portion 42 thereof.

The two brackets D employed in the structure are preferably alike and they are supported by the shelf projections 40 on the body so that they extend parallel with each other or are in parallel planes, as shown throughout the drawings.

Each bracket D involves a flat web-like portion or center 50 with a base 51 finished to rest or seat upon the shoulder 41 of a shelf projection 40. Main lugs 52 project from edges of the web 50 and carry units of the operating means F which in turn support or engage studs E projecting from the clamp B. Guide lugs 53 also project from the edges of the web 50 and slidably support the studs E at points adjacent or close to the clamp B. In the preferred arrangement the main lug and guide lug that form the support or guide for a stud E are spaced a substantial distance apart so that they effectively stabilize or brace the stud and it is preferred that the brackets be such as to carry the main lugs 52 at points substantially removed from the clamp section B so that the operating units carried by the main lugs are free and accessible at the exterior of the body or beyond the body at a point opposite the portion of the body where the clamp section is supported. From the drawings it will be apparent that the brackets, as illustrated, are of such extent as to extend from the shelves 40 near the clamp section past the body to support the units of the operating means F clear of the body where they are free to be operated.

The guide lugs 53 projecting from the bracket are provided with bores 60 slidably passing the studs that project from the clamp section and it is preferred, in practice, that suitable fittings 61 be provided so that lubricant can be introduced between the guide lugs and studs which lubricant may be handled or carried by grooves 62 as shown in Fig. 3 of the drawings.

Each main lug 52 carries a unit of the operating means F and in its preferred form each such unit involves an operating member having a shank portion 65 at the outer end of the lug, a head 66 on the shank and a turned pin-like projection 67 on the other end of the shank rotatably engaged in an opening or bore 68 in the main lug 52. In the preferred form of construction the pin-like projection 67 is smaller in diameter than the shank 65 forming a shoulder 69 opposing the end or outer portion of the lug 52. The reduced portion 67 extends completely through the lug and has a projecting threaded end 70 carrying a retainer or nut 71 that serves to retain the operating unit in connection with the lug 52. In the preferred arrangement a thrust member 72 is interposed between the shoulder 69 and the lug, and lock means 73 is provided for securing the nut 71 against disengagement from the threaded part 70. A sealing member 74 may be provided to seal with the lug so that foreign matter is excluded from between the part 67 and bore 68 and so that lubricant is retained between these parts.

The shank 65 of the operator or operating member projects a suitable distance beyond the lug 52 carrying the operating member and in accordance with my invention the shanks of operating members included in the structure vary in length so that the heads 66 supported thereby are so located that operating tools or devices applied thereto operate in different planes and thus clear each other. With an arrangement such as is shown in the drawings the heads 66 on the lugs of one bracket are considerably higher than the heads on the members carried by the lugs of the other bracket providing an arrangement which makes it simple to pass an operating tool over or beyond certain of the heads in order to reach or engage other heads. The heads 66, as shown in the drawings, are enlargements having tool receiving openings 76, it being preferred that each head have several openings so that tools or operating bars can be engaged with each head at different angles or from different directions.

In accordance with the present invention each operating member, as above described, is provided with a socket 80 entering it through the threaded portion 70 and extending through the turned pin portion 67 and preferably into the shank portion 65. The socket 80 is screw threaded to receive the end portion 81 of a stud projecting from the clamp section B. The inner end portion of the socket occurring beyond the end 83 of the stud forms a lubricant carrying chamber which may be supplied with lubricant through a suitable fitting 84 carried by a head 66. In the preferred construction packing or sealing rings 85 are carried by the stud to operate in smooth or unthreaded portions 86 of the socket to check the escape of lubricant from between the operating member and stud.

The studs E are preferably simple straight bars or posts secured to the clamp section B to project therefrom so that they slide through the guide lugs 53 and enter the sockets 80 in the operating members carried by the main lugs 52. In the particular case illustrated each stud has a threaded end 90 threaded into a socket 91 in a boss 92 provided on the clamp section. The studs may be set in connection with the clamp section by spot welding as at 92. It is to be understood that the several studs E provided in connection with the clamp section are parallel with each other and the stud receiving parts, as above described, are parallel so that the studs are free to move in such manner as to shift the clamp section B relative to the body in order to cooperate with the plate C.

From the foregoing description it will be apparent that the operating members of means F are rotatably carried by the main lugs 52 so that they are free to rotate but are positively held against axial movement. When the operating members are turned or rotated, as for instance by tools engaged with the heads 66 the threaded engagement between the operating members and the studs results in axial shifting or movement of the studs so that the clamp section B is shifted relative to the body A. It will be understood of course that in practice the several operating members are successively operated each a limited amount so that the clamp section B is, in effect, operated uniformly. Through the present invention the welding W which secures the base portions 51 of the brackets D to the body holds the brackets rigid relative to the body with the result that the several studs are effectively guided relative to the body and are prevented from twisting or becoming distorted as a result of strains or pressures that may occur by reason of shifting of the clamp section relative to the body. It is to be understood that when the structure or fitting is mounted in a manifold or system of pipes, substantial pressure may be required to operate the clamp section relative to the body and such pressure or pressures may have a marked tendency to cause twisting or distortion of the parts of the fitting, it being these forces which are effectively resisted by the rigid structural arrangement that I have provided.

In the form of the invention illustrated in Figs. 4 and 5 of the drawings the body A' instead of being in the nature of a T-fitting is in the nature of an L with the result that it has two end portions 12ª and 15ª which are at right angles to each other. In this form of the invention the clamp section B and the parts directly related thereto may be the same as above described, the action of the clamp section with reference to the plate C being the same as that in the other form of the invention.

The brackets D' in the form shown in Figs. 4 and 5 are somewhat different than in the form first described. In this case each bracket D' is mounted on and fixed to the body A' by having its base 51ª welded to the shelf projection 40ª by welding Wª, and each bracket has guide lugs 53ª slidably passing studs projecting from the clamp section in the manner above described.

The two main lugs 52ª on each bracket D' are located differently than the lugs shown in Fig. 1. As shown in Fig. 4 one of the lugs of each bracket is spaced a substantial distance from or beyond the corresponding guide lug while the other main lugs 52ª is spaced but a short distance from the corresponding guide lug 53ª. The main lug 52ª which is farthest removed is located beyond the main portion 42ª of the body at the side of the body remote from where the clamp section is located, whereas the other main guide lug is located opposite the curved exterior 98 of the body portion 42ª.

In this form of the invention the operating members of the operating means F' may be alike throughout the construction, that is, the shanks of such elements may all be of corresponding length and yet the heads 66 of such members occur at different elevations or in different planes, by reason of the location of the main lugs 52ª as shown in Fig. 4. It is to be observed, of course, that the studs projecting from the clamp section vary in length so that the several studs properly enter and cooperate with the operating members carried by the main lugs of the brackets. In this form of the invention the desired offsetting or spacing of the heads of the operating members is gained through variation of the spacing of the main lugs from the clamp section rather than by locating the main lugs equidistant from the clamp section, in which case the spacing is gained by varying the shanks of the operating members.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A device of the character described including, an elongate body having a flow passage therethrough and a clamp face at one end thereof, a clamp located opposite said end of the body and shiftable relative thereto and having a face spaced from and opposing the said clamp face of the body, a substantially flat plate normally located between the clamp and body and engaged by said faces, a plurality of parallel studs projecting from the clamp, a bracket carried by the body and having two pairs of spaced lugs, one lug of each pair being a guide lug for a stud and the other lug of such pair being a main lug, and operating members carried by the main lugs and operatively engaged with the studs.

2. A device of the character described including, an elongate body having a flow passage therethrough and a clamp face at one end thereof, the body having shoulders on the exterior thereof, a clamp located opposite said end of the body and shiftable relative thereto and having a face spaced from and opposing the face of the body, a substantially flat plate normally located between the clamp and body and engaged by said faces, a plurality of studs projecting from the clamp, operating members engaged with the studs, and brackets supported by the shoulders and having spaced lugs supporting the studs and the operating members.

3. A device of the character described including, an elongate body having a flow passage therethrough and having shoulders on the exterior thereof at opposite sides thereof, the body having a clamp face at one end thereof, a clamp located opposite said end of the body and shiftable relative thereto and having a face spaced from and opposing the face of the body, a substantially flat plate between the clamp and body and engaged by said faces, a plurality of studs projecting from the clamp, operating members engaged with the studs, brackets supported by the shoulders and having lugs slidably holding the studs parallel with each other and supporting the operating members, and means securing the brackets to the shoulders in fixed position thereon.

4. A device of the character described including, an elongate body having a flow passage therethrough and a clamp face at one end thereof, the body having shoulders at corresponding positions on opposite sides of the body, a clamp located opposite said end of the body and shiftable relative thereto and having a face spaced from and opposing the face of the body, a substantially flat plate shiftable laterally of the body into and out of a position between the clamp and body and normally between and engaged by the said faces, like brackets supported on the shoulder, studs projecting from the clamp at said sides of the body, and operating members rotatably carried by the brackets and operatively engaged with the studs, each of said members having a head adapted to receive a tool and the head on the member at one side of the body being further removed from the clamp than is the head on the member at the opposite side of the body.

5. A device of the character described including, an elongate body having a flow passage therethrough and a clamp face at one end thereof, the body having shoulders at corresponding positions on opposite sides of the body, a clamp opposite said end of the body and shiftable relative thereto and having a face spaced from and opposing the face of the body, a substantially flat plate shiftable laterally of the body into and out of a position between the clamp and body and normally located between and engaged by said faces, like brackets supported on the shoulder and having lugs projecting therefrom, studs secured to the clamp in fixed positions relative thereto and projecting from the clamp parallel to each other at said sides of the body, and operating members rotatably carried by the lugs of the brackets and threaded to the studs, each member having a head adapted to receive a tool and the head on the member at one side of the body being further removed from the bracket supporting it than is the head on the member at the other side of the body.

6. A device of the character described including, an elongate body having a flow passage therethrough and a clamp face at one end, the body having fixed shoulders at corresponding positions on opposite sides of the body, a clamp slidably carried on the body and having a face spaced from and opposing that of the body, a substantially flat plate shiftable laterally of the body into and out of a position between the clamp and body and normally located between and engaged by said faces, like brackets supported on the shoulders, parallel studs projecting from the clamp at said sides of the body, and operating members rotatably carried by the brackets and threaded to the studs, each member having a head adapted to receive a tool and supported on a shank at one end thereof, the shank of one member being longer than that of the other member.

7. A device of the character described including, an elongate body having a flow passage therethrough and having a clamp face at one end, the body having shoulders at corresponding positions on opposite sides of the body, a clamp engaged with the body and shiftable relative thereto, the clamp having a face spaced from and opposing the face of the body, a substantially flat plate shiftable laterally of the body into and out of a position between the clamp and body and normally located between and engaged by said faces, like brackets supported on the shoulder, studs secured to and projecting from the clamp parallel with each other at said sides of the body, and operating members rotatably carried by the brackets and operatively engaged with the studs, each member having a head adapted to receive a tool and the head on the member at one side of the body being further removed from the clamp than is the head on the member at the opposite side of the body, the brackets having guide parts remote from the operating members and slidably engaged by the studs.

8. A device of the character described including, an elongate body having a flow passage therethrough and having a clamp face at one end, the body having shoulders at corresponding positions on opposite sides of the body, a clamp related to the body at one end of the passage and having a laterally apertured portion surrounding the said end of the body and slidable on the body, the clamp having a face spaced from and opposing the face of the body, a substantially flat plate engaged through the aperture in said portion of the clamp and engaged between the clamp and body and by said faces, like brackets supported on the shoulders, means fixing the brackets to the body, studs projecting from the clamp at said sides of the body and parallel with each other, and operating members carried by the brackets and operatively engaged with the studs, each member having a head adapted to receive a tool and the head on the member at one side of the body being further removed from the clamp than is the head on the member at the opposite side of the body.

9. In a fitting of the character described, a body having a flow passage therethrough and having aligned open ends and a laterally disposed end portion with a clamp face at the terminal end thereof, a clamp slidably carried by the said end portion of the body and having a clamp face spaced from and opposing the face of the body and having a side opening communicating with the space between said faces, a substantially flat plate engaged through said side opening and arranged between and clamped by said faces, studs projecting from the clamp at opposite sides of the body, like brackets in corresponding positions at said sides of the body and supported by the body, and operating members carried by the brackets and operatively engaged with the studs and adapted to move the studs lengthwise to slide the clamp on said end portion of the body.

10. In a fitting of the character described, a body having a flow passage therethrough and having aligned open ends and a laterally disposed end portion with a clamp face at its terminal end, a clamp slidably carried on the laterally disposed end portion of the body and having a clamp face spaced from and opposing the face of the body and having a side opening communicating with the space between the faces, parallel studs secured to and projecting from the clamp at opposite sides of the body, a substantially flat plate engaged through the side opening and engaged between the body and clamp and by said faces, like brackets in corresponding positions at said sides of the body and supported by the body, means fixing the brackets to the body, and operating members rotatably carried by the brackets and operatively engaged with the studs and adapted to move the studs lengthwise to slide the clamp on said end portion of the body, the said members being at the side of the body opposite that from which the said end portion projects.

11. In a fitting of the character described, a body having an L-shaped flow passage open at ends of the body, one end of the body having a clamp face, a clamp slidably carried on said end of the body and having a clamp face spaced from and opposing the face of the body and a side opening communicating with the space between the faces, parallel studs projecting from the clamp at opposite sides of the body, a substantially flat plate engaged through the side opening and engaged between the body and clamp and by said faces, like brackets in corresponding positions at said sides of the body and supported by the body, and operating members rotatably carried by the brackets and operatively engaged with the studs and adapted to move the studs lengthwise to slide the clamp on said end portion of the body.

12. In a fitting of the character described, a body having an L-shaped flow passage open at ends of the body, one end of the body having a clamp face, a clamp slidably carried on said end of the body and having a clamp face spaced from and opposing the face of the body and a side opening communicating with the space between the faces, parallel studs fixed to and projecting from the clamp at opposite sides of the body, a substantially flat plate engaged through the side opening and engaged between the body and clamp and by said faces, like brackets in corresponding positions at said sides of the body and supported by the body, means fixing the brackets to the body and operating members rotatably carried by the brackets and threaded to the studs, there being two members carried by each bracket at different distances from the clamp and adapted to move the studs lengthwise to slide the clamp on said end portion of the body.

13. A device of the character described including, a body having a flow passage therethrough and having a clamp face at one end, a clamp slidably engaged with the body and having a clamp face spaced from and opposing the face of the body and having a side opening communicating with the space between the faces, a plate passing through said opening and engaging said faces, a plurality of external projections on the clamp, elongate members anchored to the projections, and rotatable operators engaged with said members, and brackets carried by the body and having pairs of lugs thereon, each pair of lugs being related to a projection and including a lug slidably guiding one of said members and a lug supporting the operator engaged with the member.

LELAND S. HAMER.

References Cited in the file of this patent

UNITED STATES PATENTS

| Number | Name | Date |
|---|---|---|
| 844,255 | Cramer | Feb. 12, 1907 |
| 1,251,235 | Johnson | Dec. 25, 1917 |
| 1,298,173 | Cadman | Mar. 25, 1919 |
| 1,575,259 | Fisher | Mar. 2, 1926 |
| 1,841,789 | Connolly | Jan. 19, 1932 |
| 2,339,970 | Young | Jan. 25, 1944 |
| 2,340,499 | Zachow | Feb. 1, 1944 |
| 2,425,934 | Hamer | Aug. 19, 1947 |

FOREIGN PATENTS

| Number | Country | Date |
|---|---|---|
| 498,049 | France | Dec. 24, 1919 |
| 706,026 | France | of 1931 |